12/18/84 OR 4,489,230

United States Patent [19]
Yamamoto

[11] Patent Number: 4,489,230
[45] Date of Patent: Dec. 18, 1984

[54] MANUFACTURING METHOD FOR A RESISTANCE ELEMENT

[75] Inventor: Yutaka Yamamoto, Nango, Japan

[73] Assignee: Alps Electric Co., Ltd., Tokyo, Japan

[21] Appl. No.: 430,602

[22] Filed: Sep. 30, 1982

[30] Foreign Application Priority Data

Feb. 15, 1982 [JP] Japan ............................ 57-21270

[51] Int. Cl.[3] ............................ B23K 27/00

[52] U.S. Cl. .................... 219/121 LM; 219/121 LF; 338/195

[58] Field of Search .... 219/121 L, 121 LM, 121 LH, 219/121 LJ, 121 LE, 121 LF; 338/195

[56] References Cited

U.S. PATENT DOCUMENTS 4,190,759 2/1980 Hongo et al. ............ 219/121 LH
4,286,250 8/1981 Sacchetti .................. 338/195 X
4,298,855 11/1981 Mills ........................ 338/195 X

FOREIGN PATENT DOCUMENTS 2611819 9/1977 Fed. Rep. of Germany ...... 338/195

*Primary Examiner*—C. L. Albritton
*Attorney, Agent, or Firm*—Guy W. Shoup; Gerard F. Dunne

[57] ABSTRACT

A resistance element manufacturing method which forms on the surface of an electrically insulating base layer including an organic material to be carbonized by irradiation of a laser beam a laser beam transmitting electrically insulating film not carbonized by the irradiation of the laser beam, and irradiates the laser beam on the base layer through the film from one side thereof, thereby carbonizing the irradiated portion of the base layer to form a resistance layer.

10 Claims, 6 Drawing Figures

MANUFACTURING METHOD FOR A RESISTANCE ELEMENT

FIELD OF THE INVENTION

This invention relates to manufacturing a resistance element used in an electric or electronic circuit, and more particularly to a manufacturing method for a resistance element by irradiating a laser beam onto a base layer including an organic substance to thereby form a resistance layer by carbonization.

BACKGROUND OF THE INVENTION

The method of forming a resistance layer through carbonization by the irradiation by a laser beam has the feature of simplifying the manufacturing process and consequently is inexpensive to produce in comparison with other carbon element manufacturing methods. Such conventional manufacturing methods using irradiation by the laser beam, however, are defective in that the resistance layer formed by carbonization is exposed to the exterior so as to be structurally breakable, likely to fall by vibrations or the like, and may fluctuate in the resistant value due to absorption of moisture. It is often necessary to eliminate such defects by coating the resistance layer after it is formed with a film, but the film is very troublesome to form because of the resistance layer is breakable as abovementioned. As a result, the manufacturing process for the resistance element has not been fully simplified.

SUMMARY OF THE INVENTION

An object of the invention is to provide a manufacturing method for the resistance element, which eliminates the defects in the conventional techniques, improves the productivity, and has stabilized properties.

This invention is characterized in that on the surface of an electrically insulating base layer including an organic substance carbonized by irradiation by laser beam is formed a laser beam transmitting film with a electrical insulating property and which is not carbonized by the irradiation of the laser beam, the base layer being irradiated by the laser beam through the film from a side thereof, so that carbonization occurs at the portion of base layer irradiated by the laser beam, thereby forming a resistance layer.

The base layer in the present invention employs, for example, polyimide resin, polysulfone resin, polyphenylene sulfide resin, or amide-imide copolymer resin, especially polyimide resin (Capton 600F051 produced by E. I. Dupont Company) being suitable. Alternatively, the base layer may be formed of a mixture of organic material and a properly selected inorganic material, or of a compound material in layers or the like.

The laser beam transmitting film employs, for example, fluoroplastics, such as polytetrafluoroethylene, or glass, the fluoroplastics being suitable because of their intense hydrophobic properties.

These and other objects of the invention will become more apparent in the detailed description and examples which follow.

DETAILED DESCRIPTION OF THE INVENTION

Figure 1:
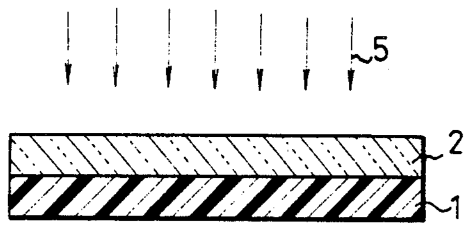
FIGS. 1 and 2 are views of a first embodiment of a resistance element manufacturing method of the invention.
Figure 2:
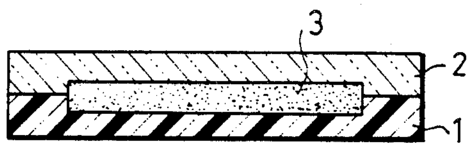

Referring to FIGS. 1 and 2, a first embodiment of a resistance element manufacturing method of the invention is shown. On the surface of a base layer 1 comprising polyimide resin or the like is formed a transparent film 2 comprising polytetrafluoroethylene or the like, of a predetermined thickness and which allows a laser beam to transmit through the layer 1, the film 2 being properly coated, printed or stuck onto the base layer 1. Thereafter, a laser beam 5, such as an argon laser, is irradiated at a predetermined scanning speed on the base layer 1 through the transmitting film 2 from a side thereof so that the base layer 1 in partly subjected to a carbonization treatment to thereby form a resistance layer 3 of desired dimensions between the base layer 1 and the transmitting film 2. In addition, the transmitting film 2 heated during the carbonization process is mostly postly melted, but thereafter is quenched to be hardened, thereby being kept as a film Thus, a resistance element of the resistance layer 3 covered overall by the base layer 1 and transmitting film 2, is obtained.

Figure 3:
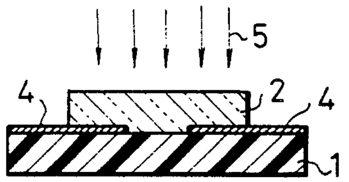
FIGS. 3 and 4 are views of a second embodiment of the same.
Figure 4:
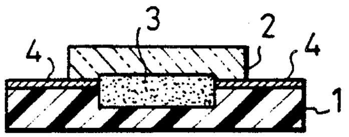

Referring to FIGS. 3 and 4, a second embodiment of the resistance element manufacturing method of the invention is shown, in which electrodes 4 are previously printed on the base layer 1 at a predetermined spacing, the electrodes 4 being coated at the inner ends thereof by the laser beam transmitting film 2, and thereafter the laser beam 5 is irradiated on the transmitting film 2 from above, thereby forming a resistance layer 3 in contact with both the electrodes 4 and coated by the transmitting film 2 as shown in FIG. 4.

Figure 5:
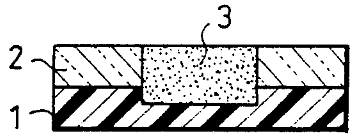
FIG. 5 is a view of a third embodiment of the same.

Referring to FIG. 5, a third embodiment of the resistance element manufacturing method of the invention is shown, in which the laser beam transmitting film 2 is formed on the surface of the base layer 1 and then the laser beam is irradiated thereon through the film 2, at which time the scanning speed of the laser beam is reduced to increase the energy of the incident laser beam, whereby the transmitting film 2 is melted to lead to exposure of the resistance layer 3. In addition, since the melted film 2 is in part permeated into the resistance layer 3, the resistance layer 3, when the film 2 employs a material such as fluoroplastics with a hydrophobic property, is also given the same property, thereby reducing fluctuations of the resistance value caused by absorption of moisture even when the resistance layer 3 is exposed. Further, when a material such as a fluoroplastic or glass is used as the transmitting film 2, which becomes sticky when melted, a resistance layer 3 of a high mechanical strength is obtained, thereby being free from cracks or brakages even when exposed.

Figure 6:
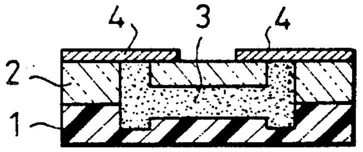
FIG. 6 is a view of a fourth embodiment of the same.

A fourth embodiment of the invention will be described according to FIG. 6, in which a laser beam transmitting film 2 is formed on the surface of a base layer 1 and transparent electrodes 4 formed of, for example indium oxide, are formed at both sides of the film 2 at a predetermined interyal, so that the laser beam is irradiated on the film 2 from one side of the electrodes 4, concentrating on the layer 1 under the electrodes 4 at slow scanning speed, whereby the resistance layer 3 formed by the carbonization process is in contacts at both ends with the electrodes 4 as shown in FIG. 6.

As seen from the above, the resistance element manufacturing method of the invention has a simplified manufacturing process composed to the conventional methods, thereby being improved in productivity and obtaining a resistance element of stable performance.

As many apparently widely different embodiments of this invention may be made without departing from the spirit and scope thereof, it is to be understood that the invention is not limited to the specific embodiments thereof except as defined in the appended claims.

What is claimed is:

1. A manufacturing method for a resistance element, comprising the steps of;

forming on the surface of an electrically insulating base layer including an organic substance to be carbonized by the irradiation of a laser beam a laser beam transmitting film with a electrical-insulating property and with the property of not being carbonized by the irradiation of said laser beam;

irradiating the laser beam on said base layer through said film from one side thereof; and forming a resistance layer by carbonizing the irradiated portion of said base layer.

2. A manufacturing method for a resistance element according to claim 1, wherein said laser beam transmitting film comprises polytetrafluoroethylene.

3. A manufacturing method for a resistance element according to claim 1, wherein said laser beam transmitting film comprises glass.

4. A manufacturing method for a resistance element according to claim 1, wherein electrodes are provided between said base layer and said laser beam transmitting film and said resistance layer formed by carbonization contacts said electrodes and is coated by said laser beam transmitting film.

5. A manufacturing method for a resistance element according to claim 1, wherein said laser beam transmitting film comprises a hydrophobic material, said resistance layer formed by carbonization including said hydrophobic material in part.

6. A resistance element manufactured by the steps of:

forming on the surface of an electrically insulating base layer including an organic substance to be carbonized by the irradiation of a laser beam a laser beam transmitting film with a electrical-insulating property and with the property of not being carbonized by the irradiation of said laser beam;

irradiating the laser beam on said base layer through said film from one side thereof; and forming a resistance layer by carbonizing the irradiated portion of said base layer.

7. A resistance element according to claim 6, wherein said laser beam transmitting film comprises polytetrafluoroethleyne.

8. A resistance element according to claim 6, wherein said laser beam transmitting film comprises a glass.

9. A resistance element according to claim 6, wherein electrodes are provided between said base layer and said laser beam transmitting film and said resistance layer formed by carbonization contacts said electrodes and is coated by said laser beam transmitting film.

10. A resistance element according to claim 6, wherein said laser beam transmitting film comprises a hydrophobic material, said resistance layer formed by carbonization including said hydrophobic material material in part.

* * * * *